(12) United States Patent  
Ueno et al.

(10) Patent No.: US 7,119,065 B2
(45) Date of Patent: Oct. 10, 2006

(54) METAL COMPLEX-PROTEIN COMPOSITE AND OXIDATION CATALYST

(75) Inventors: Takafumi Ueno, Aichi-ken (JP); Yoshihito Watanabe, Aichi-ken (JP); Masataka Ohashi, Aichi-ken (JP); Tomomi Koshiyama, Aichi-ken (JP); Norihiko Yokoi, Aichi-ken (JP)

(73) Assignee: Nagoya Industrial Science Research Institute, Nagoya (JP)

( * ) Notice: Subject to any disclaimer, the term of this patent is extended or adjusted under 35 U.S.C. 154(b) by 116 days.

(21) Appl. No.: 10/831,320

(22) Filed: Apr. 26, 2004

(65) Prior Publication Data

US 2005/0096260 A1 May 5, 2005

(30) Foreign Application Priority Data

Oct. 29, 2003 (JP) ............................. 2003-369006

(51) Int. Cl.
 A61K 33/32 (2006.01)
 A61K 31/555 (2006.01)
 G01N 33/20 (2006.01)
(52) U.S. Cl. ..................... 514/6; 530/391.3; 530/400; 530/223; 530/389.6
(58) Field of Classification Search ............... 514/6, 514/2; 530/391.3, 400, 223, 389.6
See application file for complete search history.

(56) References Cited

U.S. PATENT DOCUMENTS 5,880,149 A * 3/1999 Grinstaff et al. ............ 514/492

FOREIGN PATENT DOCUMENTS

WO WO 9808859 * 3/1998

OTHER PUBLICATIONS

Witting et al. (2001) Reaction of human myoglobin and H2O2. Electron transfer between tyrosine 103 phenoxyl radical and cysteine 110 yields a protein-thiyl radical. J. Biol. Chem. vol. 276, No. 19, pp. 16540-16547.*
Wagner et al. (1995) Structure determination of the biliverdin apomyoglobin complex: crystal structure analysis of two crystal forms at 1.4 and 1.5 A resolution. J. Mol. Biol. vol. 247, No. 2, pp. 326-337.*
Daltrop et al. (2004) In vitro studies on thioether bond formation between Hydrogenobacter thermophilus apocytochrome c(552) with metalloprotoporphyrin derivatives. J. Biol. Chem. vol. 279, No. 44, pp. 45347-45353.*
Kim et al. (2002) Synthesis of Ultralong and High. Percentage of Semiconducting. Single-walled Carbon Nanotubes, Nano Lett. vol. 2, No. 7, pp. 703-708.*
Punniyamurthy et al. (1997) Polyaniline supported cobalt(II) salen catalysed synthesis of pyrrolidine containing α-hydroxyamide core structures as inhibitors for HIV proteases, Tetrahedron Lett. vol. 38, No. 25, pp. 4463-4466.*
Katsuki, T. (2000) Metallosalen-catalyzed asymmetric oxygen-transfer reaction: dynamics of salen ligand conformation, in Peroxide chemistry, Ed. Adam, Waldemar, pp. 303-319.*
Stefanini et al. (1996) Thermal stability of horse spleen apoferritin and human recombinant H apoferritin. Arch. Biochem. Biophys. vol. 325, No. 1, pp. 58-64.*
Wardeska et al. (1986) Metal ion complexes of apoferritin. Evidence for initial binding in the hydrophilic channels. J. Biol. Chem. vol. 261, No. 15, pp. 6677-6683.*
NCBI Sequence Viewer (2005) CAA48412, myoglobin amino acid sequence, http://www.nci.nlm.nih.gov/entrez/viewer.fcgi?db=protein&val=10120.*
NCBI Sequence Viewer (2005) NP 776306, myoglobin amino acid sequence, http://www.nci.nlm.nih.gov/entrez/viewer.fcgi?db=protein&val=27806939.*
Watanabe et al. (1998) Inhibition of human cytomegalovirus proteinase by salcomine derivatives. Antivir. Chem. Chemother. vol. 9, No. 3, pp. 269-274.*
Lloyd et al. (1996) Electrostatic modification of the active site of myoglobin: characterization of the proximal Ser92Asp variant. Biochemistry. vol. 35, No. 36, pp. 11901-11912.*
NCBI Sequence Viewer 2.0 (2006) myoglobin [Haliotis madaka], http://www.ncbi.nlm.nih.gov/entrez/viewer.fcgi?db=protein&val=688388.*

(Continued)

Primary Examiner—Jon Weber
Assistant Examiner—Samuel Wei Lu
(74) Attorney, Agent, or Firm—Oliff & Berridge, PLC

(57) ABSTRACT

We claim a metal complex-protein composite comprising a salen metal complex and an apoprotein having a cavity, wherein the salen metal complex has a structure given by the following formula:

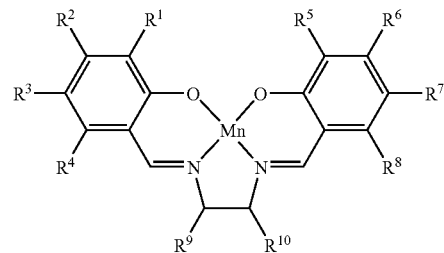

$R^1$ and $R^5$ each independently represents an alkyl group containing 1 to 5 carbon atoms; and $R^2$ through $R^4$ and $R^6$ through $R^{10}$ each represents a hydrogen atom.

8 Claims, 6 Drawing Sheets

OTHER PUBLICATIONS

NCBI Sequence Viewer 2.0 (2006) Chain A, Photorelaxed horse heart myoglobin Co complex, http://www.ncbi.nlm.nih.gov/entrez/viewer.fcgi?db=protein&val=7546626).*

Legros et al. (2003) Iron-catalyzed asymmetric sulfide oxidation with aqueous hydrogen peroxide. Angew. Chem. Int. Ed. Engl. vol. 43, isuue 44, pp. 5487-5489.*

Ohashi et al. (Mar. 2003) Semisynthetic Metalloenzymes,Angew. Chem. Int. Ed. Engl. vol. 42, No. 9, p. 961.*

M. Ohashi et al. "Abstracts of Symposium on Biofunctional Chemistry," Chiba University, Sep. 20-21, 2001. (w/ translation).

J. M. Brown et al. "The Mechanism of Asymmetric Homogeneous Hydrogenation. Solvent Complexes and Dihydrides from Rhodium Diphosphine Precursors," Journal of Organometallic Chemistry, vol. 216, 1981, pp. 263-276.

T. Matsui et al. "Formation and Catalytic Roles of Compound I in the Hydrogen Peroxide-Dependent Oxidations by HIS64 Myoglobin Mutants," J. Am. Chem. Soc., vol. 121, 1999, pp. 9952-9957.

F. Ascoli et al. "Preparation and Properties of Apohemoglobin and Reconstituted Hemoglobins," Methods in Enzymology, vol. 76, 1981, pp. 72-87.

R. Baughn et al. "Conversion of a Protein to a Homogeneous Asymmetric Hydrogenation Catalyst by Site-Specific Modification with a Diphosphinerhodium(I) Moiety," Journal of the American Chemical Society, 100:1, Jan. 4, 1978, pp. 306-307.

J. Collot et al. "Artificial Metalloenzymes for Enantioselective Catalysis Based on Biotin-Avidin," J. Am. Chem. Soc., vol. 125, 2003, pp. 9030-9031.

* cited by examiner 3,3'-Me$_2$-Salen Ligand

[Mn^III(3, 3'-Me_2-salen)] BF_4

Salen Metal Complex-Apomyoglobin Composite

Salophen Metal Complex-Apomyoglobin Composite

| | Apomyoglobin | Metal Complex | | | | Reactivity | |
|---|---|---|---|---|---|---|---|
| | | Skelton | 3-position | 3'-position | M | rate※ | ee% |
| Example1 | Apo-H64D/A71G Mb | salen | Me | Me | Mn | 464 | 32(S) |
| Example2 | Apo-H64D/A71G Mb | salen | Et | Et | Mn | 135 | 5.7(S) |
| Example3 | Apo-H64D/A71G Mb | salen | nPr | nPr | Mn | 180 | 13(R) |
| Comparative Example1 | Buffer | salen | Me | Me | Mn | 62 | 0 |
| Comparative Example2 | Apo-H64D/A71G Mb | salophen | Et | Et | Mn | 166 | 3(S) |

※Unit of Rate: ×10⁻³ turnover number/minute

FIG.6

| | Sulfide | %ee | rate |
|---|---|---|---|
| Example4 | PhS-Et | 27(S) | 593 |
| Example5 | PhCH₂-S-Me | 39(R) | 503 |

※Unit of Rate: × $10^{-3}$ turnover number/minute

METAL COMPLEX-PROTEIN COMPOSITE AND OXIDATION CATALYST

BACKGROUND OF THE INVENTION

1. Field of the Invention

The present invention relates to a novel metal complex-protein composite and a novel oxidation catalyst.

This patent application claims foreign priority benefit of the filing dates under 35 U.S.C. 119 of Japan application Japan 2003-369006 filed Oct. 29, 2003.

2. Description of the Prior Art

The inventor of the present invention has proposed metal complex-protein composites of salophen complexes inserted in a cavity of apomyoglobin (apo-Mb) by non-covalent bonding. Here apomyoglobin is obtained by liberating a heme from an oxygen storage protein, myoglobin (Mb). The inventor synthesized, for example, a metal complex-protein composite including a metal complex of manganese with N,N'-bis(salicylidene)-1,2-phenylenediamine kept in the cavity of apomyoglobin, and reported that such composites were useful for asymmetric oxidation reaction of thioanisole (the Proceedings of the 16$^{th}$ Biofunctional Symposium, '1S1-11 Construction of Artificial Enzyme by Insertion of Metal Complex into Apomyoglobin Cavity' (published in September 2001).

The prior art composites of the salophen complexes, however, have still insufficient oxidation reactivity and enantioselectivity. Development of higher-active composites has thus been highly demanded.

SUMMARY OF THE INVENTION

The object of the invention is thus to provide a novel metal complex-protein composite. The object of the invention is also to provide a novel oxidation catalyst.

As the result of intensive studies, the inventor of this invention has developed a novel metal complex-protein composite as a useful oxidation catalyst. The metal complex-protein composite of the present invention has a specific structure that a salen metal complex expressed by Formula (1) given below is received in a cavity of a protein:

[Chemical Formula 1]

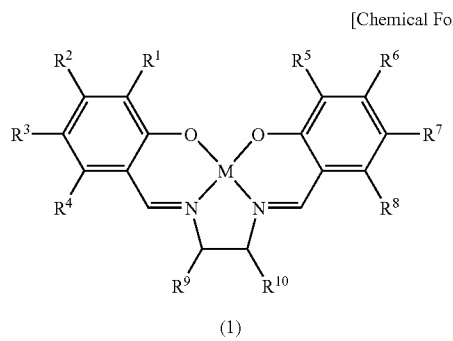

(1)

where M in Formula (1) represents a metal ion, and $R^1$ through $R^{10}$ independently represent any of hydrogen atom, halogen atoms, linear and non-linear alkyl groups containing 1 to 5 carbon atoms, and linear and non-linear alkoxy groups containing 1 to 5 carbon atoms.

The metal complex-protein composite of the present invention may have a specific structure that a complex of a metal ion with a quadridentate ligand is received in a cavity of a protein, where the quadridentate ligand has nitrogen atoms of Schiff base skeletons linked by either of an alkyl chain and a substituted benzene and atoms other than nitrogen. In this case, it is preferable that the metal ion is either divalent or trivalent.

The metal complex-protein composite of the invention may have a specific structure that a metal complex expressed by Formula (2) given below is received in the cavity of the protein:

[Chemical Formula 2]

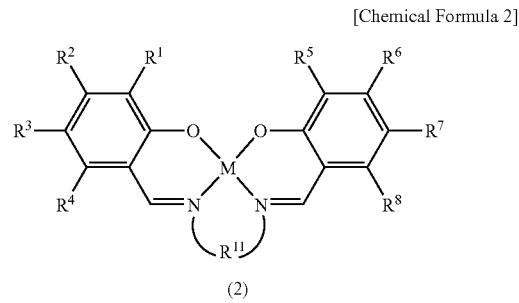

(2)

where M in Formula (2) represents a metal ion, $R^1$ through $R^8$ independently represent any of hydrogen atom, halogen atoms, alkyl groups containing 1 to 5 carbon atoms, and alkoxy groups containing 1 to 5 carbon atoms, and $R^{11}$ represents any of —(CH$_2$)n-, where n is an integral number of 2 to 4, —CH=CH—, —CH$_2$CH=CHCH$_2$—, and benzene having a substituent.

The metal complex-protein composite of the invention is synthesizable with an achiral and readily available ligand and favorably accelerates an oxidation reaction. The metal complex-protein composite of the invention has sufficiently high reactivity of sulfide oxidation and good enantioselectivity.

In Formula (1) and (2), the metal ion M may be any of iron, manganese, chromium, cobalt, and nickel. Manganese and chromium are preferable, and manganese is especially preferable. In preferable examples, $R^1$ and $R^5$ independently represent alkyl groups containing 1 to 5 carbon atoms, whereas $R^2$ through $R^4$ and $R^6$ through $R^{10}$ are all hydrogen atoms. In an especially preferable structure, $R^1$ and $R^5$ are identical alkyl groups containing 1 to 5 carbon atoms. Methyl (Me) group, ethyl (Et) group, and n-propyl (n-Pr) group are preferable examples of the alkyl groups containing 1 to 5 carbon atoms. The sizes of the $R^1$ and $R^5$ substituent groups determine the fixation position of the metal complex in the cavity of the protein and affect the extent of incorporation of the reaction substrate. The sizes of the $R^1$ and $R^5$ substituent groups are thus specified adequately according to the metal species, the size of the cavity of the protein, and the reaction substrate. It is preferable that $R^{11}$ represents —(CH$_2$)n-, where n is an integral number of 2 to 4.

Any of diverse methods may be applied to synthesis of the metal complex-protein composite of the invention. Typically there are two applicable methods. One method inserts the metal complex into the cavity of the protein. The other method adds a material of the metal complex (the material that is changed to the metal complex by a reaction), which is to be received in the cavity of the protein, to a system including the protein having the cavity and synthesizes the metal complex in the system simultaneously with insertion of the metal complex into the cavity. One concrete procedure of the former method mixes the protein having the cavity with the metal complex at an equivalent ratio of 1 to 0.5 through 100 or preferably at an equivalent ratio of 1 to 1.1 through 2. Preferable solvents for the mixing reaction include mixed solvents of water and acetone, mixed solvents of water and methanol, mixed solvents of water and dimethylformamide (DMF), mixed solvents of water and dimethyl sulfoxide (DMSO), and water alone. Especially preferable are mixed solvents of water and acetone and mixed solvents of water and methanol. The mixing temperature is in a range of −10 to 200° C. and is preferably in a range of 1 to 4° C. The mixing time is in a range of 0.5 minutes to 24 hours and preferably in a range of 5 to 30 minutes. One concrete procedure of the latter method mixes the protein with the metal ion at an equivalent ratio of 1 to 0.5 through 100 or preferably at an equivalent ratio of 1 to 1.1 through 2. Preferable solvents for the mixing reaction include mixed solvents of water and acetone, mixed solvents of water and methanol, mixed solvents of water and DMF, mixed solvents of water and DMSO, and water alone. Especially preferable are mixed solvents of water and acetone and mixed solvents of water and methanol. The mixing temperature is in a range of −10 to 200° C. and is preferably in a range of 1 to 4° C. The mixing time is in a range of 0.5 minutes to 24 hours and preferably in a range of 5 minutes to 1 hour. Another applicable procedure inserts the metal complex into the cavity of the protein carried on a carrier by either of the above two methods. Still another applicable procedure prepares a metal complex-protein composite and replaces the ligand of the metal complex with another ligand. The counter anion of the metal complex received in the cavity of the protein is not specifically restricted. Typical example of the counter anion include halogen anions like fluoride ion, chloride ion, and bromide ion, tetrafluoroborate anion and perchlorate anion.

The protein of the invention may be any one of proteins having either of an amino acid residue that coordinates to the selected metal ion of the metal complex and an amino acid residue that forms a non-covalent bond to the ligand of the metal complex in the cavity thereof, multimers of such proteins, and variants of such proteins. The protein of the invention may otherwise be any one of proteins having the cavity in a heme site by removing a heme from heme-containing proteins, multimers of such proteins, and variants of such proteins. Concrete examples include apomyoglobin, apohemoglobin, apoheme oxygenase, apocatalase, apocytochrome, apoferritin, and their variants. The terminology 'apo' is a prefix representing a protein having a defective cofactor or a defective prosthetic group. Apomyoglobin and apohemoglobin have a defective heme, and apoferritin has a defective iron ion. The variant of the protein preferably has a replacement of an amino acid residue at a position affecting the chemical reaction field of the metal complex received in the cavity of the protein with another amino acid residue suitable for the chemical reaction. The variant of apomyoglobin is, for example, apomyoglobin (polypeptide chain of 153 amino acids) having replacement of one or plurality of the $64^{th}$ amino acid residue, the $71^{st}$ amino acid residue, athe $93^{rd}$ amino acid residue, and the $107^{th}$ amino acid residue. A preferable example is an apomyoglobin variant having replacement of the $64^{th}$ histidine (His64) and of the $71^{st}$ alanine (Ala71). Especially preferable is an apomyoglobin variant having a replacement of His64 with aspartic acid and a replacement of Ala71 with glycine. When the protein is apomyoglobin or its variant, the distance between a nitrogen atom Nε in an imidazole skeleton of histidine (His93) as the $93^{rd}$ amino acid residue and the metal ion of the metal complex is preferably in a range of 0.205 to 0.245 nm (2.05 to 2.45 Å). Different metal species generally give different optimum activation sites. The optimum distance is thus preferably specified for each metal species by, for example, calculation of molecular dynamics.

The oxidation catalyst of the invention is composed of the metal complex-protein composite discussed above and functions to accelerate oxidation reactions. The oxidation catalyst of the invention effectively enhances the rate of an oxidation reaction and the enantioselectivity of a reaction product. The amount of the oxidation catalyst used depends upon the reaction vessel and the economical efficiency. The molar ratio S/C (where S denotes a reaction substrate and C denotes the catalyst) is preferably in a range of 10 to 10000 or more specifically in a range of 50 to 5000. The reaction substrate is not specifically restricted but may be any compound having a site to be oxidized. For example, various sulfides are applicable to the reaction substrate. The sulfides include alkyl phenyl sulfides, such as methyl phenyl sulfide (thioanisole) and ethyl phenyl sulfide, and alkyl benzyl sulfides, such as benzyl methyl sulfide and benzyl ethyl sulfide. Typical examples of the solvent of the oxidation reaction include water, mixed solvents of water and lower alcohols (for example, methanol and ethanol), mixed solvents of water and lower ketones (for example, acetone and methyl ethyl ketone), mixed solvents of water and DMF, and mixed solvents of water and DMSO. The reaction temperature is in a range of −10 to 200° C. and is preferably in a range of 1 to 50° C. The mixing time is in a range of 0.5 minutes to 24 hours and is preferably in a range of 5 minutes to 10 hours. This oxidation reaction may be in a batchwise operation or in a flow operation.

BRIEF DESCRIPTION OF THE DRAWINGS

FIG. 6 is a table showing results of another asymmetric oxidation reaction.

EXAMPLES

Some examples of the invention are discussed below.

Example 1

Figure 1:
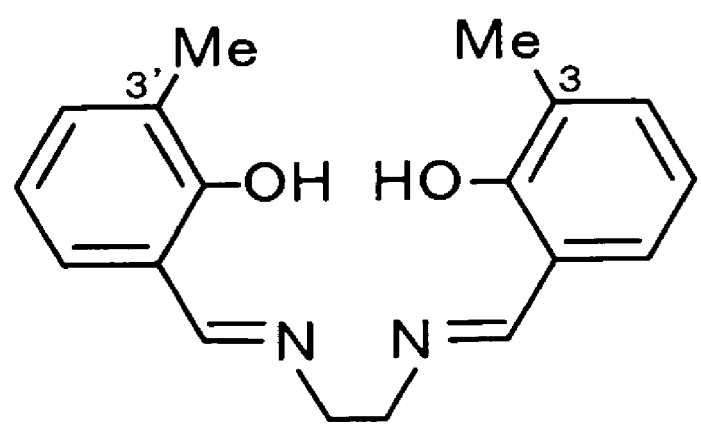
FIG. 1 shows a salen ligand.

3,3'-Me$_2$-salen ligand (see FIG. 1) was synthesized first. The procedure of synthesis dissolved 0.27 g (2 mmol, Sigma-Aldrich Inc.) in 10 ml of ethanol, added 0.06 g (1 mmol) of ethylenediamine dropwise to the solution, and refluxed the mixed solution at 90° C. for 2 hours. Removal of the solvent by evaporation gave the yellow product, 3,3'-Me$_2$-salen ligand.

Figure 2:
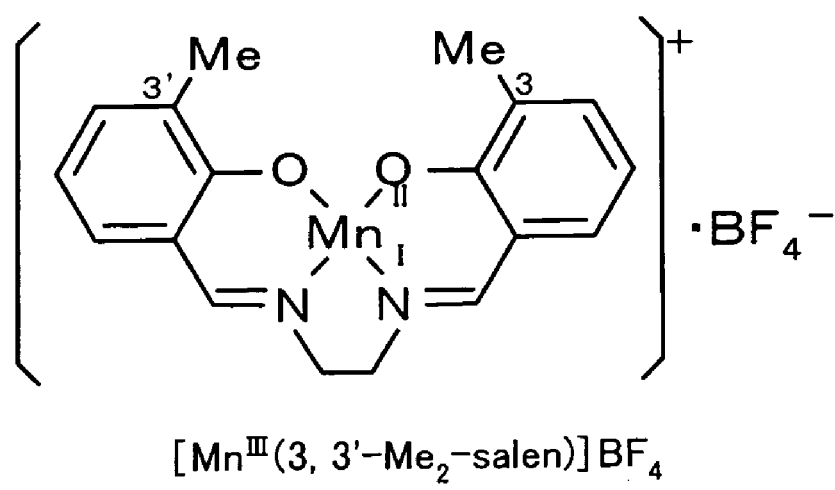
FIG. 2 shows a salen metal complex.

[Mn$^{III}$(3,3'-Me$_2$-salen)]$^+$BF$_4^-$ (see FIG. 2) was then synthesized. The procedure of synthesis dissolved 50 mg (0.16 mmol) of the synthesized 3,3'-Me$_2$-salen ligand in 8 ml of ethanol, added 33 mg (0.16 mmol) of MnCl$_2$.H$_2$O to the solution, and refluxed the mixed solution at 85° C. for 4 hours. The refluxed solution was stirred overnight at room temperature and was concentrated to give the brown precipitate, [Mn$^{III}$(3,3'-Me$_2$-salen)]$^+$Cl$^-$. The procedure then dissolved 15 mg (0.04 mmol) of [Mn$^{III}$(3,3'-Me$_2$-salen)]$^+$Cl$^-$ in 5 ml of methanol, added 7.7 mg (0.04 mmol) of AgBF$_4$ to the solution, and refluxed the mixed solution at 75° C. for 6 hours. After stirring overnight at room temperature, concentration of the reaction solution and subsequent addition of ether to the concentrate yielded the brown product [Mn$^{III}$(3,3'-Me$_2$-salen)]$^+$BF$_4^-$.

Figure 3:
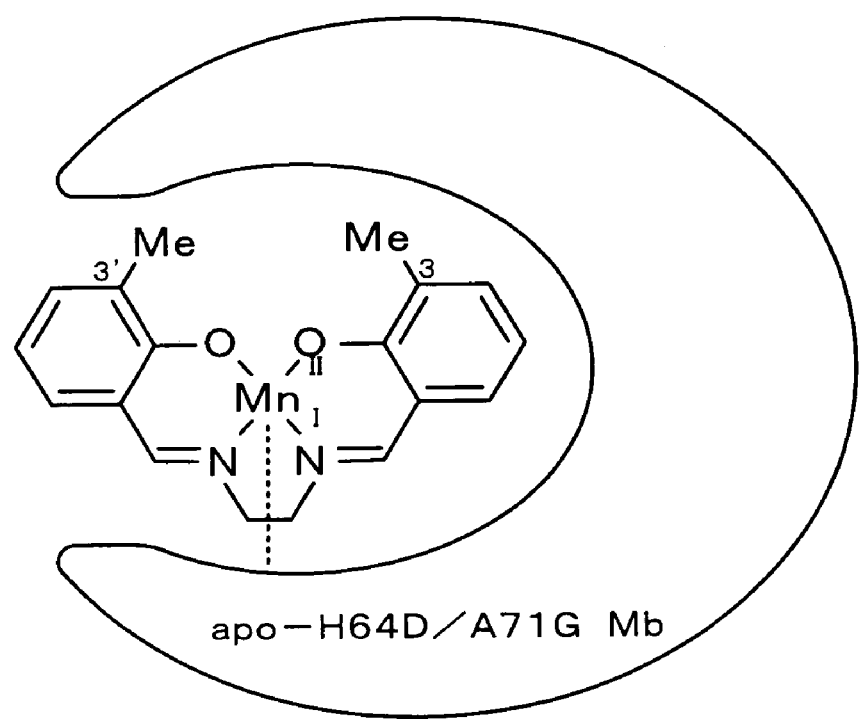
FIG. 3 shows a salen metal complex-apomyoglobin composite.

A salen metal complex-apomyoglobin composite (see FIG. 3) was synthesized as discussed below. All the operations for the synthesis were performed at a temperature of 4° C. Histidine as the 64$^{th}$ amino acid residue and alanine as the 71$^{st}$ amino acid residue of myoglobin were respectively replaced with aspartic acid and with glycine according to the procedure disclosed in a cited reference (T. Matsui et al. J. Am. Chem. Soc., 1999, vol121, p9952–9957). The variant myoglobin was processed by the acid-butanone method described in a cited reference (F.Ascole et al. Method Enzymol. 1981, vol76, p72–87) and was dialyzed with 0.61 of 10 mM Tris/HCl buffer solutions (pH 7.0) for 6 hours. This gave apomyoglobin, which is hereafter referred to as apo-H64D/A71G Mb. The procedure then added 1 to 1.5 equivalent weight of the methanol solution of [Mn$^{III}$(3,3'-Me$_2$-salen)]$^+$BF$_4^-$ dropwise to the apomyoglobin solution, stood the solution mixture still for 10 minutes, and dialyzed the solution mixture with 1l of 10 mM Tris/HCl buffer solutions (pH 6.0) for 6 hours. The reconstructed composite was isolated and purified by gel filtration chromatography with G25 and G50 (10 mM Tris/HCl buffer solution (pH 7.0)). Here G25 and G50 respectively represent Sephadex G25 Medium and Sephadex G50 Medium (manufactured by Amersham Biosciences K.K.). The resulting composite was identified by ESI-TOF MS (electrospray ionization time-of-flight mass spectrometry), UV-vis (ultraviolet-visible spectroscopy), and atomic absorption spectroscopy. The observed value by ESI-TOF MS was 17643.2, which well agreed with the calculated value 17643.0. The absorption maximum wavelengths of the composite in UV-vis analysis were 281 nm ($\epsilon$3.7×10$^5$) and 317 nm ($\epsilon$3.3×10$^4$). This example used tetrafluoroborate anion as the counter anion of the metal complex for the easy production of the composite, although chloride ion may be used instead.

Figure 5:
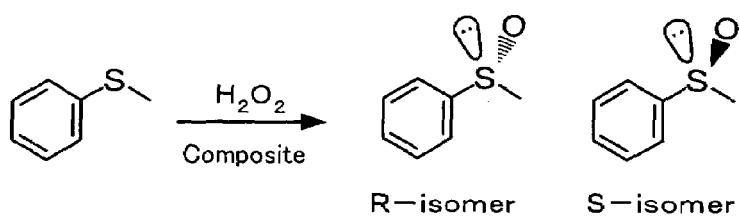
FIG. 5 is a composite depiction of a scheme for an asymmetric oxidation reaction of thioanisole and a table showing results from performing the reaction.

The resulting salen metal complex-apomyoglobin composite was used for asymmetric oxidation reaction of thioanisole to sulfoxide. After addition of 1 mM thioanisole, 1 mM hydrogen peroxide, and acetophenone as an internal standard substance to a 10 μM salen metal complex-apomyoglobin solution (50 mM sodium acetate buffer (pH 5.0)), the mixture was made to react at 35° C. for 10 minutes. A reaction product was extracted with 0.5 ml of dichloromethane. After removal of dichloromethane with the air blast, the extract was dissolved in a 10% isopropyl hexane solution and was analyzed with a Daicel chiralcel OD column by HPLC (Shimadzu LC-10AD pump system, Shimadzu SPD-10A spectrophotometer, n-hexane/2-propanol=90/10). The observed reaction rate (the turnover number per minute) and enantioselectivity are shown in the table of FIG. 5. The concentration of the product was determined according to the peak area intensity ratio of the reaction product to the internal standard substance in HPLC.

The salen metal complex-apomyoglobin composite was also used for asymmetric oxidation reactions of ethyl phenyl sulfide and benzyl methyl sulfide, similarly to the asymmetric oxidation reaction of thioanisole. The results of the former reaction were 27 ee % (S) and 593×10$^{-3}$ turnover number/minute, and the results of the latter reaction were 39 ee % (R) and 503×10$^{-3}$ turnover number/minute.

Example 2

According to the procedure of Example 1, 3,3'-Et$_2$-salen ligand (having Et at the 3-position and the 3'-position of FIG. 1), [Mn$^{III}$(3,3'-Et$_2$-salen)]$^+$BF$_4^-$ (having Et at the 3-position and the 3'-position of FIG. 2), and a corresponding salen metal complex-apomyoglobin composite were synthesized. The observed value of the resulting composite by ESI-TOF MS was 17669.6, which well agreed with the calculated value 17671.1. The resulting salen metal complex-apomyoglobin composite was used for asymmetric oxidation reaction of thioanisole. The results of the reaction are shown in FIG. 5.

Example 3

According to the procedure of Example 1, 3,3'-Pr$_2$-salen ligand (having n-Pr at the 3-position and the 3'-position of FIG. 1), [Mn$^{III}$(3,3'-Pr$_2$-salen)]$^+$BF$_4^-$ (having n-Pr at the 3-position and the 3'-position of FIG. 2), and a corresponding salen metal complex-apomyoglobin composite were synthesized. The observed value of the resulting composite by ESI-TOF MS was 17698.5, which well agreed with the calculated value 17699.1. The resulting salen metal complex-apomyoglobin composite was used for asymmetric oxidation reaction of thioanisole. The results of the reaction are shown in FIG. 5.

Comparative Example 1

[Mn$^{III}$(3,3'-Me$_2$-salen)]$^+$BF$_4^-$ obtained in Example 1 was not complexed with the apomyoglobin but was used alone for asymmetric oxidation reaction of thioanisole. The results of the reaction are shown in FIG. 5.

Comparative Example 2

Figure 4:
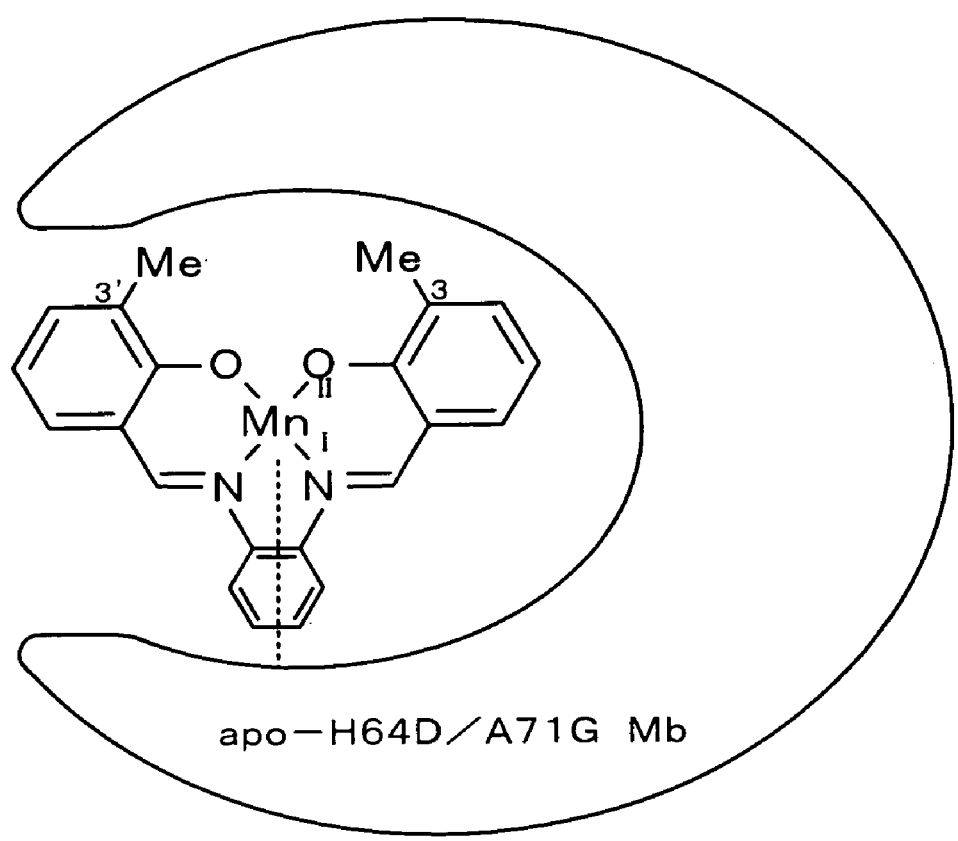
FIG. 4 shows a salophen metal complex-apomyoglobin composite.

[Mn$^{III}$(3,3'-Et$_2$-salophen)]$^+$BF$_4^-$ was synthesized in a similar manner to that of Example 1 and was complexed with the apomyoglobin apo-H64D/A71G Mb to a salophen metal complex-apomyoglobin composite (see FIG. 4). The resulting salophen metal complex-apomyoglobin composite was used for asymmetric oxidation reaction of thioanisole. The results of the reaction are shown in FIG. 5.

[Results]

According to the table of FIG. 5, the salen metal complex alone (no complexation with apomyoglobin) of Comparative Example 1 had a significantly low reaction rate of 62 and no enantioselectivity. The salen metal complex-apomyoglobin composites of Examples 1 through 3, on the other hand, had sufficiently high reaction rates of 135 to 464 and significant enantioselectivity. While the salophen metal complex-apomyoglobin composite of Comparative Example 2 had the reaction rate of 158 and the enantioselectivity of 23 ee % (S), the salen metal complex-apomyoglobin composite of Example 1 had significantly improved reaction rate of 464 and enantioselectivity of 32 ee % (S). The salen metal complex-apomyoglobin composite having methyl group as the substituent group at the 3-position and the 3'-position had the enantioselectivity of 32 ee % (S), which was lowered to 6 ee % (S) by replacement of methyl group with ethyl group. The salen metal complex-apomyoglobin composite having n-propyl group at the 3-position and the 3'-position had the inverse enantioselectivity of 13 ee % (R).

A salen metal complex-apomyoglobin composite having hydrogen atom at the 3-position and 3' position and a salophen metal complex-apomyoglobin composite having hydrogen atom at the 3-position and 3'-position were also synthesized. But these composites were rather unstable than the composites of Examples 1 through 3.

[Crystal Structure]

Myoglobin has a polypeptide chain of 153 amino acids and an iron-porphyrin (hem) as the prosthetic group. A nitrogen atom (His93Nε) in an imidazole skeleton of histidine as a the $93^{rd}$ amino acid in the polypeptide chain coordinates to iron. The distance between the nitrogen atom His93Nε and the metal ion in the salen metal complex-apomyoglobin composite accordingly affects the reactivity of asymmetric oxidation and the enantioselectivity. The distance between the nitrogen atom His93Nε and the metal ion in the salen metal complex-apomyoglobin composite of Example 1 was calculated as discussed below.

While crystallization of the salen metal complex-apomyoglobin composite was unsuccessful, a modification of the salophen metal complex-apomyoglobin composite of Comparative Example 2 (that is, a composite of the salophen metal complex and a variant apomyoglobin apo-A71G Mb having a replacement of alanine as the $71^{st}$ amino acid residue with glycine) was successfully crystallized. The distance between the nitrogen atom His93Nε and the manganese ion in the salen metal complex-apomyoglobin composite of Example 1 was calculated to be 0.228 nm (2.28 Å) by the technique of molecular dynamics based on the crystal structure data of the modified composite. An X-ray generator (Rigaku FR-E) and a detector (Rigaku R-AXJS VII) were used for the crystal structure analysis. The software and the hardware used were TURBO-FR0D0 by AFMB-CNIRS and a work station UNIX Octane by SGI Japan Ltd. The software insight II/Discover 3.0 using the ESFF force field by Accelrys Inc. and the work station UNIX Octane were adopted for the calculation of molecular dynamics.

Examples 4 and 5

According to the procedure of Example 1, 3,3'-Me$_2$-salen ligand (see FIG. 1), [Mn$^{III}$(3,3'-Me$_2$-salen)]$^+$BF4$^-$ (see FIG. 2), and the corresponding salen metal complex-apomyoglobin composite were synthesized. The resulting salen metal complex-apomyoglobin composite was used for oxidation reactions of C$_6$H$_5$SC$_2$H$_5$ (ethyl phenyl sulfide) and C$_6$H$_5$CH$_2$SCH$_3$ (benzyl methyl sulfide). The results of the reaction are shown in FIG. 6.

What is claimed is:

1. A metal complex-protein composite, comprising a salen metal complex and an apoprotein having a cavity, wherein:
   the salen metal complex is situated in the cavity of the apoprotein;
   the salen metal complex is selected such that the salen metal complex does not cause degradation or instability of the apoprotein;
   amino acid residues of the apoprotein coordinate with the salen metal complex; and
   the salen metal complex has a structure given by Formula (1):

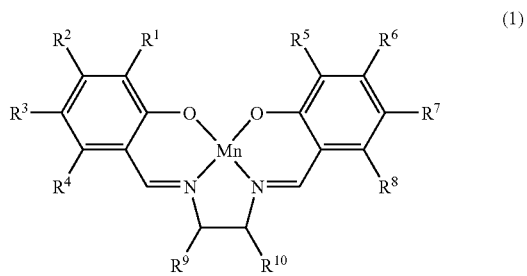

where:
   R$^1$ and R$^5$ each independently represents an alkyl group containing 1 to 5 carbon atoms; and
   R$^2$ through R$^4$ and R$^6$ through R$^{10}$ each represents a hydrogen atom.

2. The metal complex-protein composite of claim 1, wherein;
   R$^1$ and R$^5$ each independently represents a methyl group, an ethyl group, or an n-propyl group.

3. The metal complex-protein composite of claim 1, wherein the apoprotein is any one of apoproteins having an amino acid residue that coordinates to the manganese ion of the salen metal complex or an amino acid residue that forms a non-covalent bond to the ligand of the salen metal complex in the cavity, multimers of such apoproteins, and variants of such apoproteins.

4. The metal complex-protein composite of claim 1, wherein the apoprotein is any one of apoproteins in which the cavity is located in a heme site obtained by removing a heme from a heme-containing protein, multimers of such apoproteins, and variants of such apoproteins.

5. The metal complex-protein composite of claim 1, wherein the apoprotein is selected from the group consisting of apomyoglobin, apohemoglobin, apoheme oxygenase, apocatalase, apocytochrome, apoferritin, and their variants.

6. The metal complex-protein composite of claim 1, wherein the apoprotein is any one of apomyoglobin and its variants having a distance between a nitrogen atom Nε in an imidazole ring of a histidine residue coordinated to iron in myoglobin and the manganese ion of the salen metal complex in a range of 0.205 to 0.245 nm.

7. An oxidation catalyst, comprising the metal complex-protein composite of claim 1, wherein the oxidation catalyst is capable of accelerating an oxidation reaction.

8. The oxidation catalyst of claim 7, wherein the oxidation catalyst is capable of accelerating an asymmetric oxidation reaction of a sulfide.

* * * * *